US006662081B1

(12) United States Patent
Jacober et al.

(10) Patent No.: US 6,662,081 B1
(45) Date of Patent: Dec. 9, 2003

(54) MEDICATION REGIMEN CONTAINER AND SYSTEM

(75) Inventors: Jeffrey M. Jacober, Providence, RI (US); Patrick Fong Wing Hon, Sunshine (HK)

(73) Assignee: MEDport LLC, Providence, RI (US)

( * ) Notice: Subject to any disclaimer, the term of this patent is extended or adjusted under 35 U.S.C. 154(b) by 0 days.

(21) Appl. No.: 09/590,394

(22) Filed: Jun. 8, 2000

(51) Int. Cl.[7] .............................................. G06F 17/00

(52) U.S. Cl. ...................... 700/242; 700/243; 700/244; 221/131; 221/124; 221/197; 221/268; 206/528; 206/534; 206/534.1; 206/534.2; 206/538; 206/540

(58) Field of Search ................................ 700/214, 215, 700/216, 217, 242–244, 218, 231; 221/131, 124, 197, 268; 206/528–540, 534.1, 534.2

(56) References Cited

U.S. PATENT DOCUMENTS

| | | | | | |
|---|---|---|---|---|---|
| 4,381,059 | A | * | 4/1983 | Schurman | 116/308 |
| 4,465,191 | A | | 8/1984 | Darbo | |
| 4,473,156 | A | * | 9/1984 | Martin | 116/308 |
| 4,483,626 | A | | 11/1984 | Noble | |
| 4,970,669 | A | * | 11/1990 | McIntosh et al. | 340/309.15 |
| 5,014,875 | A | * | 5/1991 | McLaughlin et al. | 221/122 |
| 5,197,632 | A | * | 3/1993 | Kaufman et al. | 221/197 |
| 5,200,891 | A | * | 4/1993 | Kehr et al. | 221/15 |
| 5,257,693 | A | | 11/1993 | Kwasniak | |
| 5,289,157 | A | * | 2/1994 | Rudick et al. | 340/309.15 |
| 5,376,070 | A | * | 12/1994 | Purvis et al. | 604/31 |
| 5,408,443 | A | * | 4/1995 | Weinberger | 221/3 |
| 5,431,299 | A | * | 7/1995 | Brewer et al. | 221/12 |
| 5,620,109 | A | | 4/1997 | Madden | |
| 5,642,731 | A | * | 7/1997 | Kehr | 600/300 |
| 5,646,912 | A | * | 7/1997 | Cousin | 221/15 |
| 5,724,021 | A | | 3/1998 | Perrone | |
| 5,752,621 | A | * | 5/1998 | Passamante | 221/13 |
| 5,835,455 | A | * | 11/1998 | Hanson et al. | 221/2 |
| 5,954,225 | A | | 9/1999 | Powe | |
| 5,954,641 | A | * | 9/1999 | Kehr et al. | 128/920 |
| 5,971,594 | A | * | 10/1999 | Sahai et al. | 221/15 |
| 5,983,783 | A | | 11/1999 | Archard et al. | |
| 6,004,020 | A | * | 12/1999 | Bartur | 221/123 |
| 6,065,819 | A | * | 5/2000 | Holmes et al. | 312/215 |
| 6,075,755 | A | * | 6/2000 | Zarchan | 221/3 |
| 6,102,855 | A | * | 8/2000 | Kehr et al. | 206/561 |

(List continued on next page.)

FOREIGN PATENT DOCUMENTS

| | | |
|---|---|---|
| FR | 2 785 793 A | 5/2000 |
| WO | WO 98/01368 | 1/1998 |
| WO | WO 98/19647 | 5/1998 |

OTHER PUBLICATIONS

European Patent Office Search Report In European Application No. 01304888.9, mailed Jul. 3, 2003.

*Primary Examiner*—Donald P. Walsh
*Assistant Examiner*—Jeffrey A. Shapiro
(74) *Attorney, Agent, or Firm*—Cook, Alex, McFarron, Manzo, Cummings & Mehler, Ltd.

(57) ABSTRACT

A personal medication in storage dispensing unit is provided for receiving and storing medication, vitamins, minerals, phytochemicals, pills capsules, gel tablets and the like in a manner which is easily accessible and which is conducive to inclusion within a medication regimen system. A medication regimen monitor can be included in this system in order to be programmed to signal proper medication dosage times. The monitor preferably provides non-compliance information, preferably information which persists and which designates which portion of the medication regimen was not complied with. The system also can include a holder for multiple storing and dispensing units in an ordered fashion consistent with daily requirements of the medication regimen.

50 Claims, 8 Drawing Sheets

U.S. PATENT DOCUMENTS

| | | | | | |
|---|---|---|---|---|---|
| 6,107,911 | A | | 8/2000 | Perrone | |
| 6,109,774 | A | * | 8/2000 | Holmes et al. | 221/12 |
| 6,149,029 | A | * | 11/2000 | de Meyer et al. | 221/25 |
| 6,151,536 | A | * | 11/2000 | Arnold et al. | 700/236 |
| 6,163,736 | A | * | 12/2000 | Halfacre | 221/102 |
| 6,219,587 | B1 | * | 4/2001 | Ahlin et al. | 700/233 |
| 6,238,322 | B1 | * | 5/2001 | Hsu | 428/123 |
| 6,304,797 | B1 | * | 10/2001 | Shusterman | 700/236 |
| 6,338,007 | B1 | * | 1/2002 | Broadfield et al. | 221/123 |

* cited by examiner

MEDICATION REGIMEN CONTAINER AND SYSTEM

BACKGROUND OF THE INVENTION

The invention generally relates to improvements in personal medication regimen compliance. More particularly, the invention relates to a medication storage and dispenser unit suitable to be associated with a holder for the units and a medication regimen monitor, either singly, in partial combination or in full combination.

Personal management of daily medication use has witnessed many developments directed to improving storage and dispensing or providing means for reminding a user when to take medication to remain in compliance with the regimen prescribed by the medical professional or which is to be otherwise complied with in connection with the ingestion of medication. Medication is understood to encompass synthetic or natural medications, including pharmaceuticals, prescription drugs, over-the-counter drugs, vitamins, minerals, phytochemicals, pills, caplets, tablets, capsules, gels, and the like.

An example of a portable dispenser for dispensing small articles such as pills is found in Madden U.S. Pat. No. 5,620,109, incorporated hereinto by reference. Dispensers of this type are designed to be easily operable by a person experiencing difficulty in grasping and manipulating small objects. Its sliding mode of operation assists those who are hindered in finger strength and/or dexterity. Access to the interior of the container is gained by pushing on the exterior of a tray wall so as to push a tray and slide the container open.

Also generally know are medication alarm devices to provide daily reminders of times to take medication. Often these types of units provide a reminder function only, leaving it up to the user or caregiver to keep track of issues such as whether or not the medication was actually taken at the proper time and whether or not a scheduled medication dose or combination of medications was missed, and if so which dose or combination was missed.

Developments such as these provide independent functions. That is, one provides a storage and perhaps an organizational function, whereas the other provides a reminder function, at least in the short term. It would be desirable to provide improved units which organize, store and dispense medication. It would be desirable to provide units which enhance and supplement the basic medication reminder system. It also has been determined that a useful combined effect could be achieved by providing a system that performs some or all of these functions, and particularly a system which is designed to be capable of performing all of these functions, the selection of which can be at the discretion of the user.

SUMMARY OF THE INVENTION

In accordance with the present invention, a personal medication storage and dispensing unit is provided which is of a type having a tray within a sleeve. The unit includes one or more dividers transversely positioned to segment the tray into a plurality of compartments. In a preferred arrangement of the unit, cooperating engagement members provide a plurality of registry locations which are operative when the tray is extended to open one or more of the compartments. Also included as being suitable for use with the storage and dispensing units is a multiple-day medication storage and dispensing holder having a plurality of the storage and dispensing units nestable within saddles of the holder. Preferably each saddle corresponds to a day during which medication is to be taken. In another aspect of the invention, a system is provided which includes a medication regimen monitor preferably in a form by which the monitor is securely attachable and readily detachable from the medication storage and dispensing unit. The medication regimen monitor has operational logic which provides settable multiple alarm times, a compliance indicator arrangement, and a non-compliance indicator arrangement.

It is a general object of the present invention to provide an improved medication storage and dispensing unit, system and method.

Another object of this invention is to provide an improved apparatus and method for managing daily medication use.

Another object of the present invention is to provide an improved apparatus and method for providing reminder information and compliance information for facilitating the maintenance of a regimen of medication as noted herein, which encompasses vitamins, minerals, phytochemicals, prescription and non-prescription drugs, and other pharmaceuticals, whether in the form of pills, capsules, caplets, gels, tablets or in some other form, and the like.

Another object of this invention is to provide an improved apparatus and method which incorporate a system for electronically monitoring a regimen of medication contained within a slidable storage tray which is readily attachable to the monitor, which can be in further combination with a holder for a plurality of the dispensing units.

Another object of the present invention is to provide an improved system for storing, monitoring and conveniently dispensing medication in accordance with a prescribed regimen or other need.

Another object of this invention is to provide an improved apparatus and method for electronically monitoring a medication regimen, which preferably includes displaying a non-compliance message and maintaining a non-compliance message for a substantial time period.

These and other objects, features and advantages of the invention will be apparent from and clearly understood through a consideration of the following detailed description.

BRIEF DESCRIPTION OF THE DRAWINGS

In the course of this description, reference will be made to the attached drawings, wherein.

DESCRIPTION OF THE PREFERRED EMBODIMENTS

Figure 1:
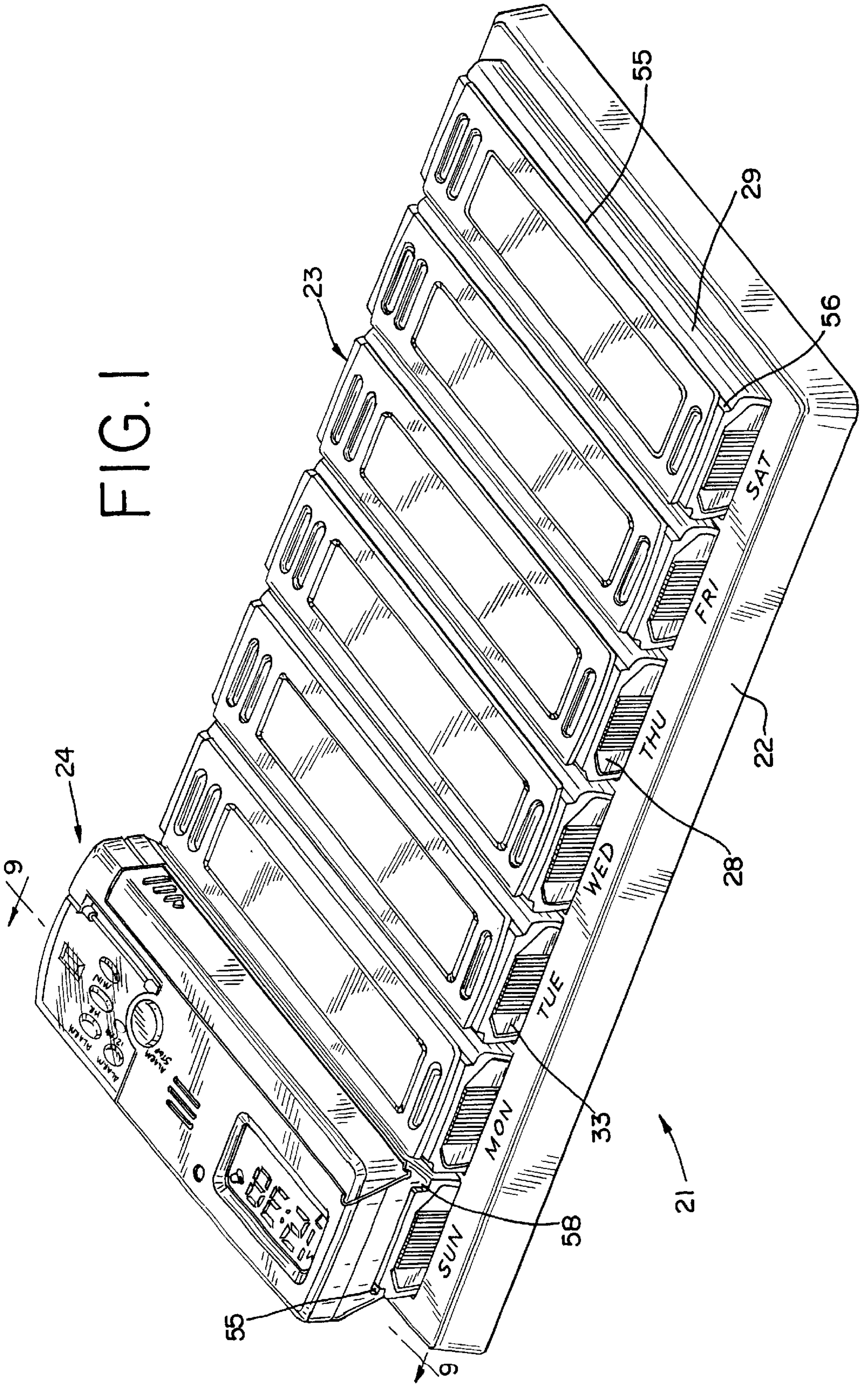
FIG. 1 is a perspective view illustrating an entire system incorporating all aspects of the invention.

The entire system incorporating each of the basic aspects of the invention is generally illustrated at 21 in FIG. 1. Included in this full system is a holder 22, shown receiving a plurality of storage and dispenser units, generally shown at 23. A medication regulator monitor, generally shown at 24, is illustrated positioned onto one of the storage and dispenser units.

Figure 2:
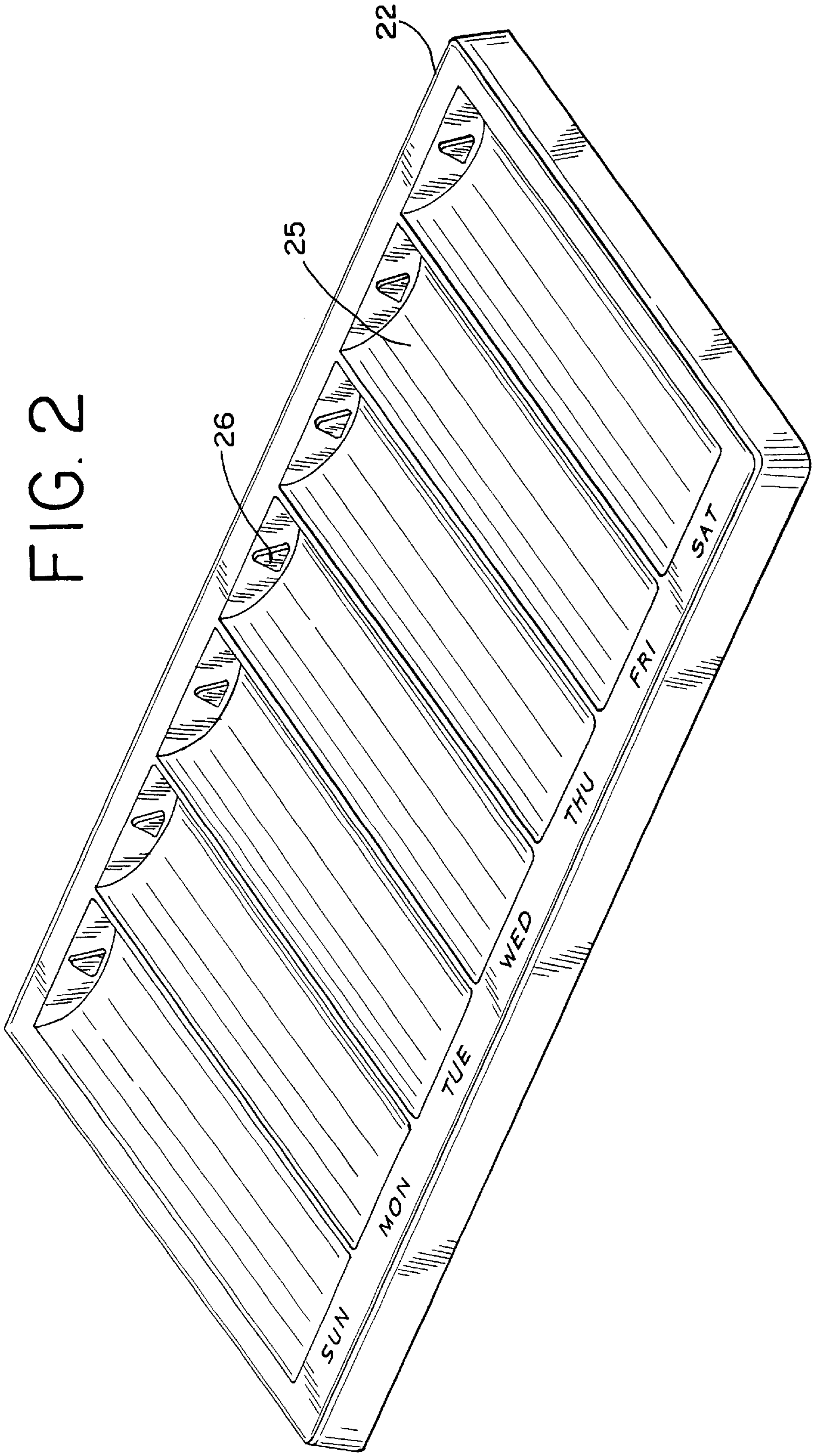
FIG. 2 is a perspective view of a preferred embodiment of a holder component of the invention.

When the holder 22 is included within the system, it can have an overall structure as shown in FIG. 2. A holder is provided when there is a desire to provide an organized array of a number of the storage and dispenser units 23. Including a holder provides a neatening and unifying effect, as well as a set location for each unit 23. A plurality of saddles 25 accommodates a like number of storage and dispenser units 23. In the illustrated embodiment, seven such saddles are provided, and each is marked with indicia to signify a different day of the week. In this arrangement, the storage and dispenser unit 23 within the saddle 25 denoted with the Sunday indicia contains the medication and the like scheduled to be taken on that day. It will be appreciated that certain medication regimens can vary medications or dosages from day-to-day, making it important to have a means for designating the medication needed for a given day.

The illustrated holder 22 is a generally planar tray which conveniently rests on a flat surface. Other configurations can be suitable for the holder. It can have a stacked configuration. It can be curved rather than planar in its overall appearance. It can be generally vertically oriented. Means can be provided to assist in holding each unit within each saddle, and such is especially suitable when the holder supports the storage and dispenser units in an orientation which is not horizontal.

Figures 3, 4:
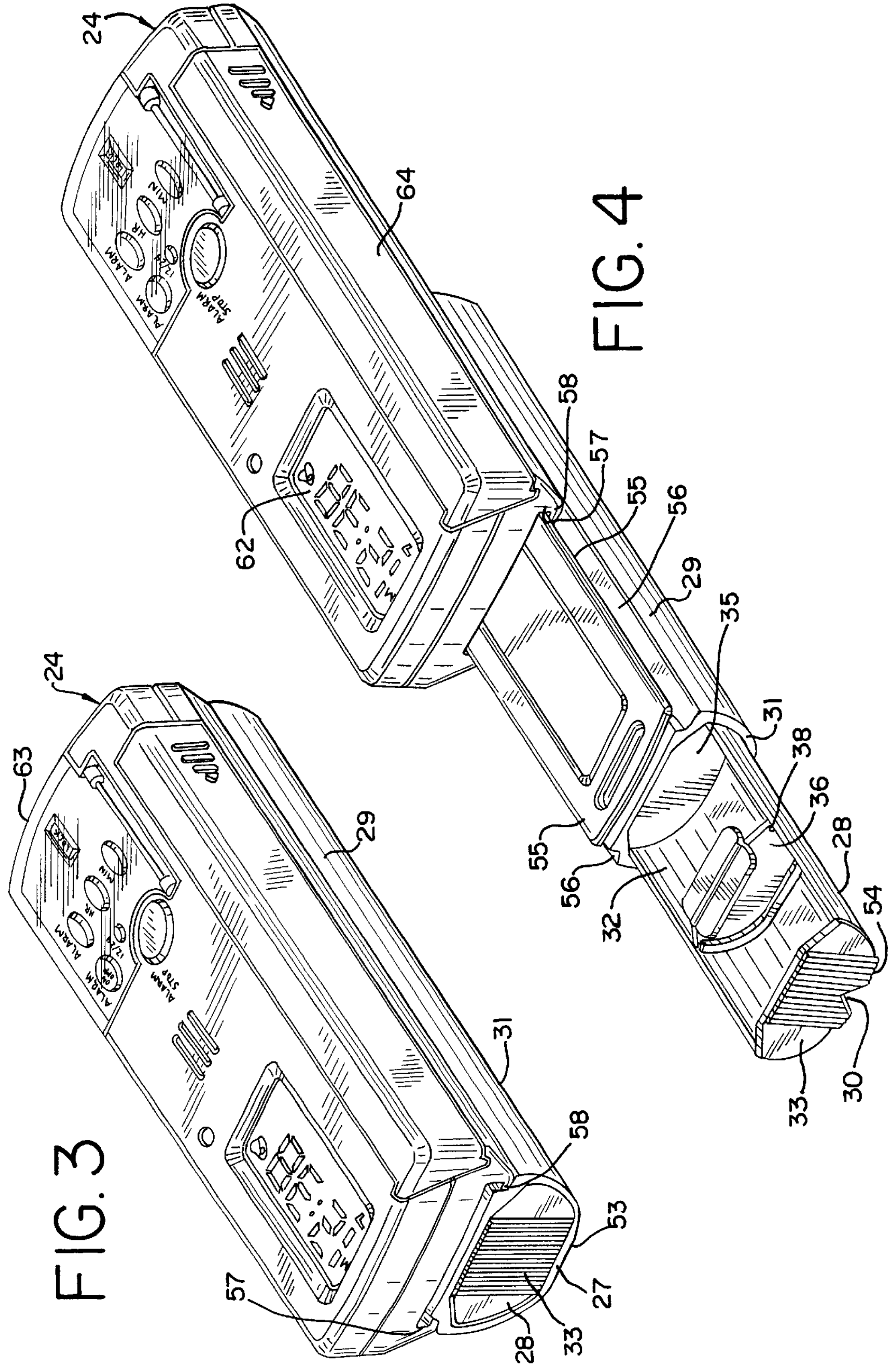
FIG. 3 is a perspective view of the combination of a medication storage and dispensing unit with a medication regimen monitor.
FIG. 4 is a perspective view of the combination shown in FIG. 3, with the sliding aspects of this embodiment being illustrated.
Figure 5:
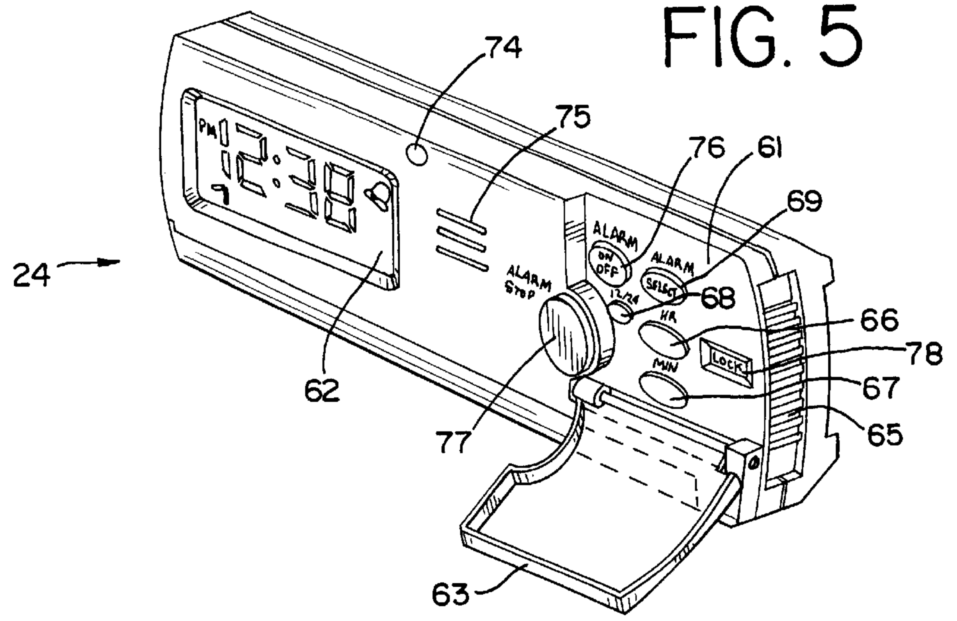
FIG. 5 is a perspective view of a preferred medication regimen monitor, showing its protective cover in an open mode.
Figure 6:
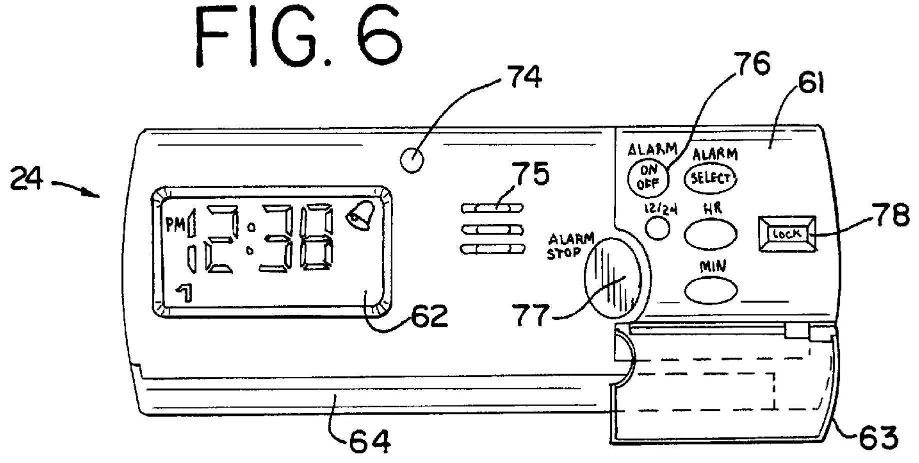
FIG. 6 is a front elevational view of the monitor as shown in FIG. 5.
Figure 7:
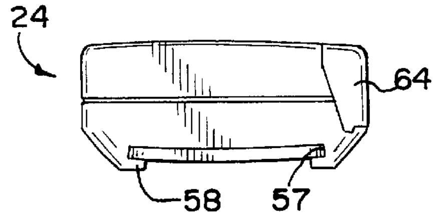
FIG. 7 is a left elevational view of the preferred medication regimen monitor.
Figure 8:
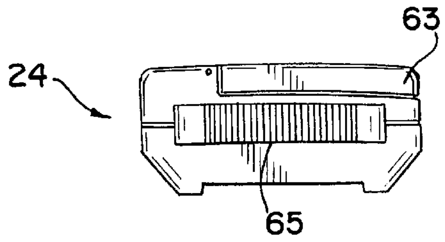
FIG. 8 is a right elevational view of the preferred medication regimen monitor.
Figure 9:
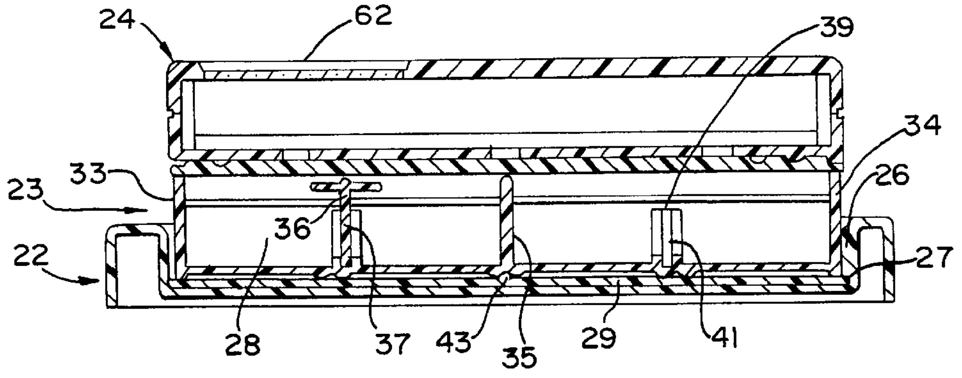
FIG. 9 is a cross-sectional view along the line 9—9 of FIG. 1.
Figure 10:
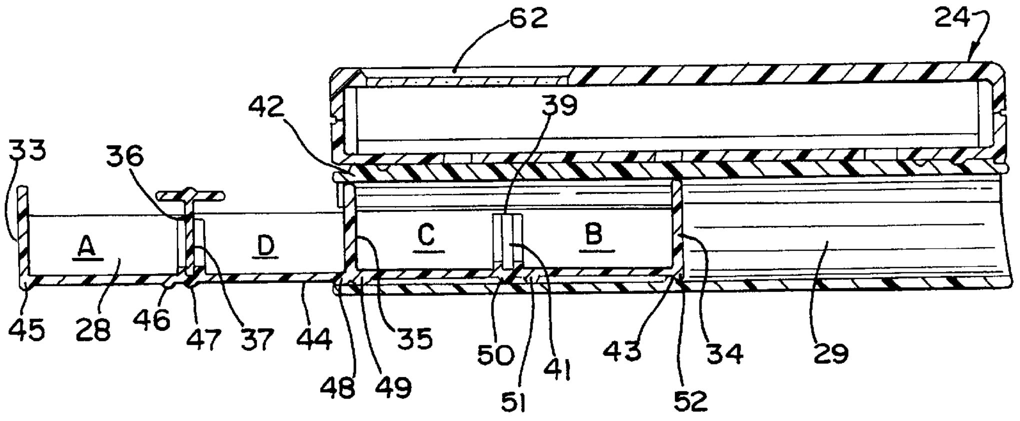
FIG. 10 is a sectional view similar to FIG. 9, with the storage and dispensing unit removed from the holder, and with the tray shown in an open condition.

Typical means for assuring the maintenance of the units within the saddles until removal is desired include opposing surfaces with interference tapers, indents, detents, tabs, snaps, hook-and-loop members, or any other suitable approaches by which components can be releaseabley attached. Such arrangements are illustrated in FIG. 2 and FIG. 4 and FIG. 9. At least one detent 26 is associated with each saddle 25. When a storage and dispenser unit 23 is fitted within the saddle, an indent or depression 30 (FIG. 4) is provided in the tray and/or sleeve, or a projecting edge portion 27 (FIG. 9) of the tray snaps under detent 26. While only one detent is shown, more than one can be provided as desired or needed, depending upon the orientation and configuration of the holder and the storage and dispenser units. Indents or depressions 30 can be provided on the storage and dispenser unit which are complementary in size and shape so as to accommodate detent 26 and provide an especially secure and positive snap-fit of the unit onto the holder.

With further reference to the aspect of the invention concerning the storage and dispenser units 23, each includes a tray component 28 and a sleeve component 29. Particular reference in this regard is made to FIG. 3, FIG. 4, FIG. 9 and FIG. 10. Tray 28 and sleeve 29 are longitudinally slidable with respect to each other. In the illustrated embodiment, this is facilitated by having the internal surface of the sleeve have a shape and size so as to closely and slidingly accommodate the outside surface of the tray. A sidewall 31 of the sleeve overlies a body wall 32 of the tray. In the drawings, sidewall 31 and body wall 32 are generally curved elongated surfaces. In addition, in the illustrated embodiment of the holder 22, the saddles 25 each also have an elongated curved surface. This combination of curved surfaces provides an attractive, compact interfitting relationship among the holder, the sleeve and the tray. Tray component 28 also includes end walls 33, 34.

Preferably, a permanent divider is provided within the tray component 28. Illustrated in this regard is a permanent, transverse divider wall 35. This divider wall splits the tray volume into two volumes. Either or both of these volumes can be further split by a removable divider 36, one being shown in FIG. 4, FIG. 9 and FIG. 10. Removable divider 36 rests in a slot 37. Preferably, removable divider 36 is held in place by a suitable interference fit, such as between a notch 38, shown in the divider 36 in FIG. 4, and a rib 39, shown in empty slot 41 in FIG. 9 and FIG. 10. It will be appreciated that another removable divider can be positioned within the empty slot 41.

With both removable dividers in place in the embodiment which is illustrated, a total of four volumes are provided within which medicaments, such as different medicaments, are positioned. In a desirable use, the medicaments to be taken at the first dosage time in a given day will be within an outside one of these compartments, with the next medicament(s) being within the next compartment, and so-forth. Solely for purposes of illustration, the depicted four compartments are designated as A, B, C and D in FIG. 10. This illustrates a sequence of emptying the compartments for dosage intake. In this example, compartment A would be opened first and depleted first. That tray would then be closed until the next medicament dosage time arrives. Then, the tray would be slid (to the right in FIG. 9) until compartment B is opened by sliding the tray to the right until compartment B is no longer covered by elongated wall 42. After that medicament regimen is removed, the tray is slid to the left, and the unit is again fully closed. At the next dosage time, the tray is again slid to the right as shown in the drawings, until compartment C is exposed. After the medicaments have been removed, the unit is again closed. Then, at the last dosage time in the day in this example, tray is slid to left until reaching the relationship shown in FIG. 10. At that time, medicament can be removed from compartment D.

Accessing compartments one at a time as achieved in the preceding example is facilitated by stop members. With particular reference to FIG. 9, the stop arrangements which are provided in the illustrated embodiment are as follows. Interference members are provided both on the inside surface of the sleeve and on the outside surface of the tray. The location of these interfering members can be selected as desired. For example, they may be differently placed depending upon the cross-sectional configuration of the tray and the cross-sectional configuration of the sleeve. Interference members could also be provided in association with the permanent divider, such as by sizing the permanent divider to interfere with a lip on the sleeve. The specific interference members which are shown it FIG. 9 and FIG. 10 include a raised pip 43 in the longitudinal and lateral center of the sleeve, along with an indented channel 44 positioned longitudinally on the outside bottom surface of the tray component 28. Channel 44 includes a plurality of raised stops, including end stops 45 and 52, central stop pair 48, 49, and intermediate stop pairs 46, 47 and 50, 51.

The preferred cross-sectional configuration of the tray component 28, as well as of the sleeve component 29, is generally semi-circular. The preferred shape includes a generally flatted bottom surface 53 of the sleeve component and a corresponding generally flattened bottom surface 54 of the tray component. Preferably, the saddles 25 of the holder 22 are similarly shaped so that each of these three components are complementarily shaped with respect to each other. This shape provides a broader lateral dimension to the compartments within the tray, which has been found to advantageously accommodate multiple medications, including differently shaped pills, capsules, disks, caplets, gel capsules, and the like.

Turning now to the sleeve component 29 and particularly its upper portion as viewed in the drawings, the sleeve component will have an attachment portion when designed to be used in conjunction with the medication regulator monitor 24 within the complete system and method which can be provided and carried out as desired. Whatever attachment structures are used, they should provide secure attachment between the sleeve component and the medication regulator monitor. This secure attachment also should be easily made and released so as to be manageable by the medication taker or caregiver. It has been found that these objectives are conveniently attained by the illustrated approach, which continues with the sliding engagement arrangement which is present in the illustrated sleeve and tray attachment.

With more particular reference to the illustrated sliding engagement, reference is made particularly to FIG. 3, FIG. 4, FIG. 9 and FIG. 10. Rails 55 are provided in the illustrated embodiment. In order to maintain a narrow overall width profile, a clearance slot 56 adjoins each rail 55.

An attachment side of the illustrated medication regulator monitor is provided with structure which is slidingly complementary to the attachment system of the sleeve. In the illustrated housing, interlock slots 57 are sized and shaped to slidingly receive the rails 55 of the storage and dispenser unit, and interlocking rails 58 correspondingly slide within the clearance slot 56 of the storage and dispenser unit.

The medication regulator monitor 24 which is illustrated has a housing which includes the attachment structure as discussed. Its housing further includes a control interface area 61 and a display panel 62. A protective cover 63 is shown to pivot open and pivot closed so as to prevent unintentional changes to the settings which the user had made by way of interface members, such as buttons or pads of the control interface area 61. The illustrated unit is battery powered, and door 64 is provided to allow battery access and contact to provide power to the unit in a customary manner. A suitable control element is accessible by the user. The illustrated element in this regard is a slide switch 65, which performs as a function selector.

Figure 12:
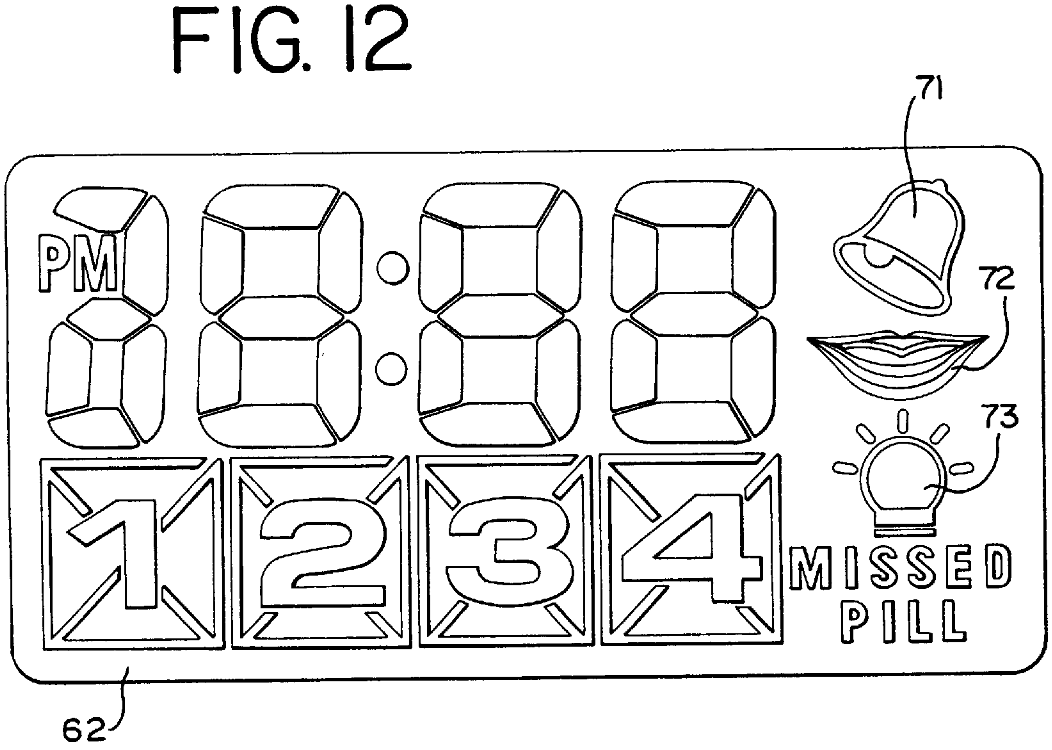
FIG. 12 is a detail view of the display panel of the illustrated medication regimen monitor.

Control interface area 61 which is illustrated has the following user interface locations. In the illustrated embodiment, these are in the form of push buttons. It will be understood other interface devices besides buttons can be used, including touch pads. Interface areas 66 and 67 allow for changing the hour (HR) setting and the minute (MIN) setting which is shown on the display panel 62. Interface area 68 allows change between a 12-hour clock and a 24-hour clock. The interface area labeled ALARM and SELECT allows the user to choose one of the alarm choices provided by the unit. The illustrated alarm choices are an alarm sound (such as Bi-Bi-Bi), this selection being indicated by a bell icon or any other selected logo 71 (FIG. 12). Another selection is a short message as: "time to take your pill," designated by the lips icon 72 or any other suitable display. The third choice is a visual signal. When this is chosen, the light icon 73, or other suitable display, is shown. When the alarm mode is activated at this setting, a light 74 or the like illuminates and/or flashes. When one of the audible alarms is selected, a speaker 75 or the like is provided. Control interface area 61 also includes an ALARM ON/OFF interface area 76.

An illustrative display panel is shown in FIG. 12. The specific mechanism by which the display is generated will be appreciated by those in the art. In addition to the time and alarm displays which are illuminated or otherwise made visible at times consistent with the operation of the unit, non-compliance displays also are provided. Illustrated displayed panel includes a MISSED PILL message which is illuminated or otherwise made visible, preferably in a flashing type of mode. This provides a message that a medication or the like was not timely taken, more particularly that the compliance interface location was not engaged. In the illustrated embodiment, this compliance interface location is the ALARM STOP button or area 77. If compliance is not thereby indicated, the non-compliance message can persist, such as by stopping and then repeating for a number of appropriate times.

Another non-compliance signal is given by a designation associated with each of the medication time or number indicia. In the illustrated embodiment, the numbers 1, 2, 3 and 4 correspond to the first, second, third and fourth, respectively, times within a 24-hour day, at which the medication regimen is to be complied with. In the event of non-compliance, the appropriate number is flagged. A suitable flag is the illustrated "X" out symbol which is shown in FIG. 12 in association with each of the dosage time numbers.

Figure 13:
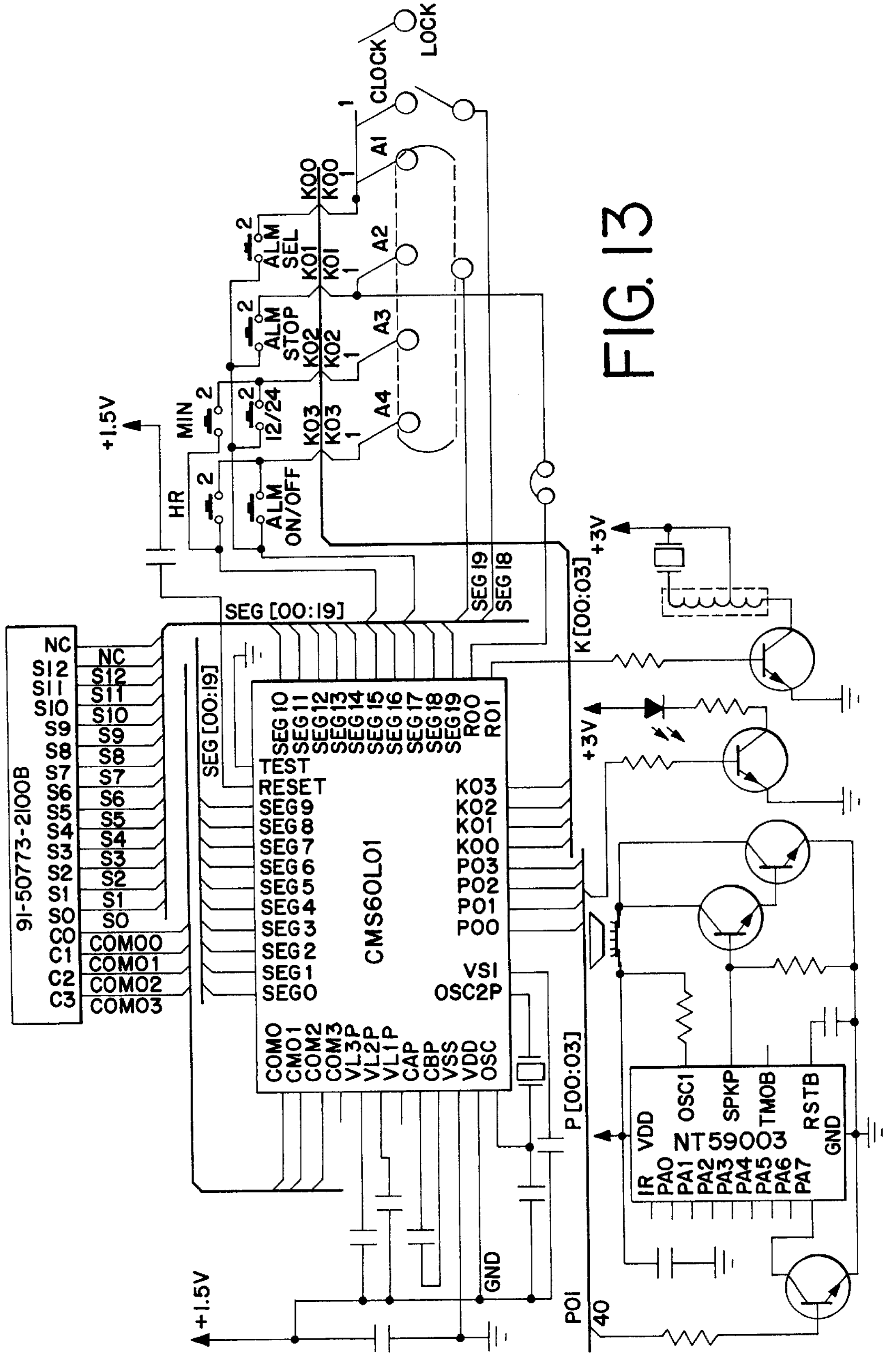
FIG. 13 is an electronic schematic detail of electronic circuitry suitable for use in the medication regimen monitor.

Specifics of the circuitry of the preferred embodiment which is shown in the drawings are provided in FIG. 13. This is in the context of a chip and its communications with the components that are exemplified, particularly in the drawings. Variations on this specific chip and its components are possible in order to achieve the logic of the monitor, whether using hardware, software or other alternative technology which achieves the desired functions and result.

Figure 11:
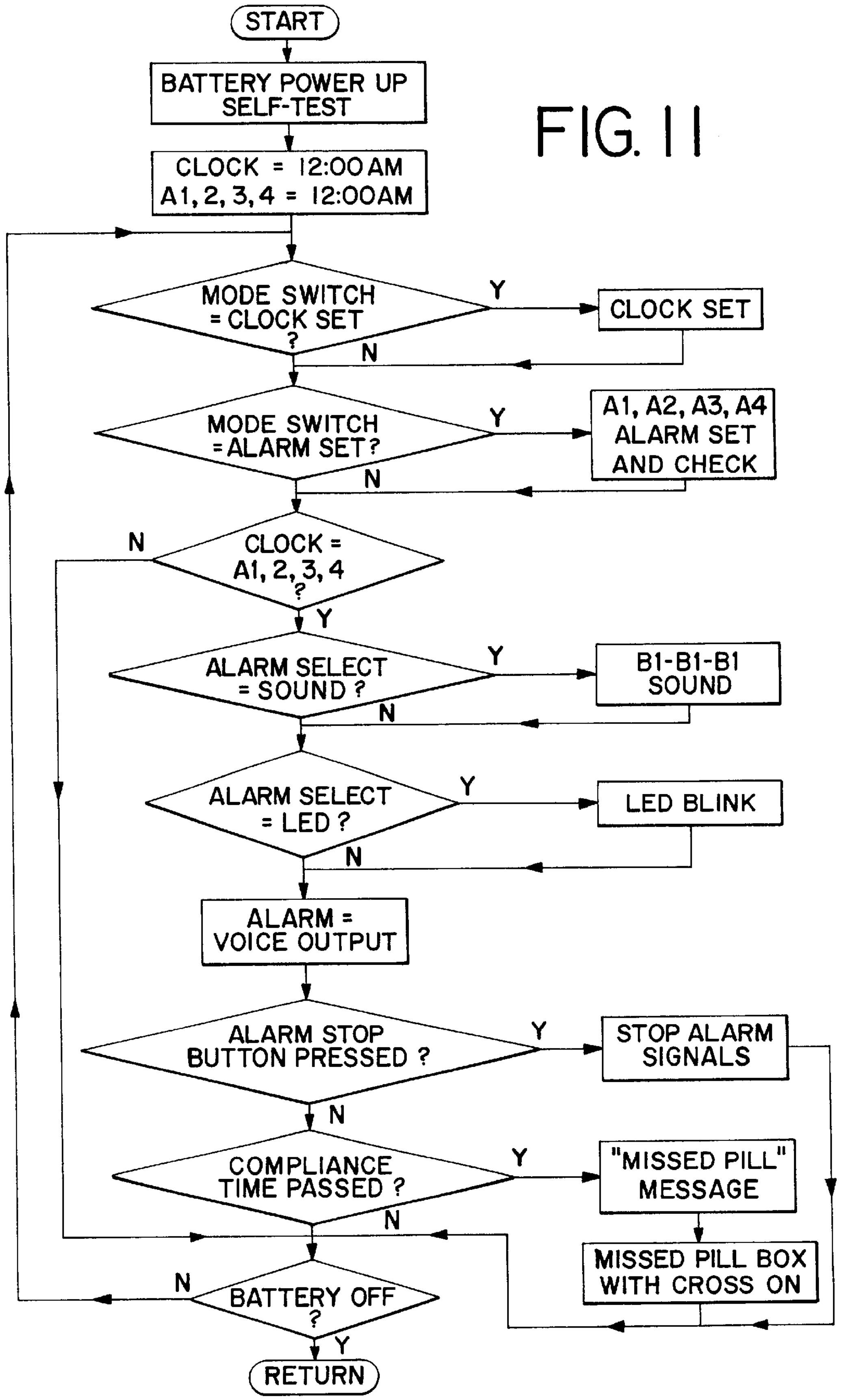
FIG. 11 is a data or logic flow chart incorporating a preferred example of operational logic suitable for the medication regimen monitor.

A preferred logic sequence is shown in FIG. 11. In its basic form, this logic prompts compliance at multiple times within a 24-hour period and also records non-compliance so that corrective measures can be taken by the patient, caregiver or medical professional, as appropriate. These functions are carried out by operational data circuitry which can be provided in any suitable form. The illustrated form incorporates a chip, but the invention is not so limited.

A window 78 can be provided for displaying the particular function being carried out by the switch or selector 65. One is the LOCK function at which all settings made during programing the unit are set in place until re-programming is desired. The next function selection of the selector or switch 65 is the CLOCK function, by which the hour and the minute, preferably that of the time of programming, is entered into the unit. Four other selector settings are provided in the illustrated example, each setting corresponding to one of the administration times programed into the device by the user. When at one of these settings, identified as A1, A2, A3 and A4 in the working example, the user sets the hour and minute at which the compliance time signal is to be given.

In use, the clock typically first will be set to the current local time. Each intended compliance time then will be set, as needed, up to four designated compliance times being possible in the illustrated embodiment. Activating the alarm can be accomplished, if necessary, by engaging an activating area 76. In order to properly function as a system unit, typically the desired compliance times will be set in ascending time order and corresponding ascending setting number order. When each setting is selected, the function selector or switch is moved to the LOCK position. The illustrated embodiment allows for selection among a beeping alarm sound, a voiced phrase sound, or a visual indicator. The voice indicator can be any suitable phrase, preferably one which will be readily understood by the user. The visual indicator can take the form of a flashing light or other convenient approach.

During operation, when each programmed compliance time is reached by the clock function, the selected message that compliance is due is given. This prompts the patient to take the medication, at which time the appropriate party is to activate the alarm stop 77, thereby indicating compliance. Another round or more of compliance prompts can be provided, such as at one minute intervals, until compliance is indicated by activating the alarm stop function. In the illustrated embodiment, a total of three compliance prompts are provided at each set alarm time.

If the total number of compliance prompts provided are not responded to, that is after the total compliance time has passed, a non-compliance indication will be given. In the illustrated embodiment, this takes the form of the appearance of a properly informing message, such as "MISSED PILL" or other appropriate indicator. In addition, in the preferred arrangement which is illustrated, a flag will be provided at the indicator for the desired compliance time or number which was not heeded. The flag shown in FIG. 12 includes a square around an appropriate number, combined with an indication of non-compliance with that desired dosage time, in this case a crossed-out symbol.

These displays will continue for almost 24 hours, at which time they will automatically disappear. Until then, a persisting message of non-compliance is provided, which message also indicates which of the desired compliance times have not been adhered to. In the illustrated embodiment, activation of the alarm stop function after the compliance prompts have been completed will remove the "MISSED PILL" display; however, the indicator such as the cross-out flags will remain evident until the programed time is reached for removal of the non-compliance message(s), or until the unit is re-programmed. In the event of multiple non-compliance events, the indicator for each instance of non-compliance will remain until cycled out as discussed.

It will be appreciated that the medication regulator monitor 24 can be used alone, with only a single storage and dispenser unit 23 securely and removably attached to it, or with the entire system including multiple storage and dispenser units positioned within a holder. In this instance, the user will fill the units 23 with appropriate medication or the like within an appropriate compartment(s). Then, at a designated date, such as the day of the week noted on the holder, the user has the monitor positioned in place on that so-designated storage and dispenser unit. As each compliance time is reached and signaled, the appropriate compartment within that storage and dispenser unit is accessed, the medication is taken, and the compliance interface area is contacted in order to stop the reminder function and avoid appearance of the non-compliance flag for that dosage time. This process continues from day to day. At an appropriate time, the medication will be replenished.

The combination of the monitor and the dispenser unit provides a convenient assembly which can be carried by or with the patient. Both the indicator and the medication are in the same unit, and there is no need for the patient or the caregiver to locate both in order to proceed with the process according to the invention.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A system for storing and dispensing medication and for monitoring a regimen for the medication to be dispensed, comprising:

a tray having an interior adapted to receive medication, said tray having a length lying along a longitudinal axis, said tray having an opening and opposing end panels;

a sleeve having length generally parallel to said longitudinal axis, said sleeve being sized and shaped to slidingly receive said tray and to selectively open and close at least a portion of said opening of the tray, and said tray and sleeve are longitudinally slidable with respect to each other and comprise a storage and dispenser unit;

an electronic medication regimen monitor having a housing and operational logic, said housing being sized and shaped to slidingly receive said sleeve and to be engaged or disengaged from said sleeve by longitudinal sliding of said sleeve and said housing with respect to each other along an axis parallel to said longitudinal axis; and said operational logic signals the timing of the medication regimen and provides prompts to dispense medication stored within said tray.

2. The system in accordance with claim 1, wherein said system includes a plurality of said units, and further including a holder having a plurality of saddles, each said saddle adapted to receive one of said units.

3. The system in accordance with claim 2, wherein each saddle is substantially identically sized and shaped, each having a recessed surface which is complementary in size and shape to that of said sleeve.

4. The system in accordance with claim 2, wherein each said saddle is generally concave in transverse cross-section, a portion of each of said tray and said sleeve is generally convex in transverse cross-section, and each of said saddle, sleeve and tray are sized and shaped to nest said tray into said sleeve and said sleeve into said saddle, with the sleeve being sized and shaped to fit within the saddle.

5. The system in accordance with claim 2, further including attachment members for releaseably securing said sleeve on said saddle.

6. The system in accordance with claim 1, wherein said operational logic signals a compliance regimen and flags non-compliance to said regimen.

7. The system in accordance with claim 1, wherein said tray includes at least one transverse divider wall to provide a plurality of compartments of the interior of said tray.

8. The system in accordance with claim 7, wherein at least one said divider is removable.

9. The system in accordance with claim 1, wherein said electronic medication regimen monitor has a control interface area and a selectively openable and closeable protective cover therefor.

10. The system in accordance with claim 6, further including a display panel for providing messages regarding compliance and non-compliance.

11. The system in accordance with claim 1, wherein said operational logic includes a clock component, a compliance time setting component associated with said clock component whereby multiple compliance times are programed as desired to signal the medication regimen, and a non-compliance component which designates when a compliance signal has not been input into the logic.

12. The system in accordance with claim 1, further including cooperating engagement members on said tray and sleeve, said engagement members providing a plurality of registry locations, one said registry location being operative when said tray is fully enclosed within said sleeve, and another said registry location being operative when said tray is extended open longitudinally with respect to said sleeve to open said interior of the tray while another portion of said interior of the tray is closed.

13. A medication regimen monitor comprising:

a housing having a least one display panel, said housing having a length lying generally along a longitudinal axis;

operational logic associated with said housing and interactive with said display panel;

a control interface area associated with said housing and interactive with said operational logic;

said operational logic induces a clock component interactive with said display panel and said control interface area;

said operational logic includes a compliance time setting component associated with said clock component, whereby multiple compliance times are programmed as desired to signal a medication regimen;

a compliance indicator interactive with said operational logic such that activation of the compliance indicator after one of said compliance times is signaled designates compliance with at least a portion of the medication regimen;

said operational logic includes a non-compliance component which designates that said compliance indicator was not activated after one of said compliance times has been signaled; and a storage and dispensing unit secured to said housing and for holding medicaments for the medication regimen, said storage and dispensing unit including a sleeve and a tray for receiving medication, said tray has a length lying generally parallel to said longitudinal axis, and said sleeve has a length generally parallel to said longitudinal axis, whereby said tray is longitudinally slidable within said sleeve and parallel to said longitudinal axis, and said sleeve is longitudinally slidable along said housing and parallel to said longitudinal axis.

14. The monitor in accordance with claim 13, wherein said operational logic is operational data circuitry supported by said housing.

15. The monitor in accordance with claim 13, wherein said compliance indicator is an alarm which is audible, visual or both.

16. The monitor in accordance with claim 15, wherein said compliance indicator audibly announces in words that it is time to dispense medication.

17. The monitor in accordance with claim 13, wherein said non-compliance component of the operational logic imparts a non-compliance flag which persists after the compliance time has elapsed.

18. The monitor in accordance with claim 17, wherein said non-compliance component also includes a removable signal which persists until a compliance indicator is activated, while said non-compliance flag remains for an extended time.

19. The monitor in accordance with claim 13, wherein said compliance component includes a removable signal which persists until a compliance indicator is activated.

20. The monitor in accordance with claim 13, further including a protective cover which is openable and closeable with respect to said control interface.

21. A personal medication storage and dispensing unit comprising:

a tray member having an interior volume adapted to receive medication, said tray member having a longitudinally extending sidewall with a length along a longitudinal axis and having opposing end panels perpendicular to said sidewall and defining an opening;

a sleeve member sized and shaped to receive therewithin said tray member, said sleeve member having a sidewall and an elongated wall having a length generally parallel to said longitudinal axis, said sleeve member selectively opening or closing said opening of the tray member when said sleeve and tray member move longitudinally with respect to each other along said longitudinal axis;

at least one divider transversely positioned within said tray to thereby split the interior volume of the tray member and define a plurality of compartments;

cooperating engagement members on said tray and sleeve members, said engagement members providing a plurality of registry locations, one said registry location being operative when said tray member is fully enclosed within said sleeve member, and another said registry location being operative when a portion of said tray member is not enclosed within said sleeve member and one of said compartments of said tray member is opened while another of said compartments is closed; and said elongated wall of the sleeve member further includes at least one rail and clearance slot for receiving a medication regimen monitor, said rail and slot extending longitudinally parallel to said longitudinal axis, whereby said regimen monitor and said sleeve member move longitudinally with respect to each other generally parallel to said longitudinal axis.

22. The unit in accordance with claim 21, further including a removable divider transversely positioned within said tray to thereby split the interior volume of one of said tray compartments.

23. The unit in accordance with claim 21, wherein said cooperating engagement members include a raised pip on one of the sleeve member or tray member and a channel on the other of said sleeve member or tray member, said channel including a plurality of raised stops to provide said plurality of registry locations.

24. The unit in accordance with claim 21, wherein each of said sidewall of the tray member and said sidewall of the sleeve member are generally curved in transverse cross-section.

25. The unit in accordance with claim 24, wherein said generally curved sidewalls have a generally flattened central run between curved sidewall areas.

26. A multiple-day medication storage and dispensing system, comprising:

a holder having a plurality of substantially identically sized and shaped saddles, each saddle having a recessed surface;

a plurality of storage and dispensing units received within respective ones of said platform saddles;

each storage and dispensing unit having a tray including an interior surface adapted to receive medication, said tray having a length along a longitudinal axis and having an opening and opposing end panels which generally define said interior surface;

each storage and dispensing unit further has a sleeve sized and shaped to slidingly receive said tray and to selectively open and close at least a portion of said opening of the tray, said sleeve has a length parallel to said longitudinal axis, said tray and sleeve are longitudinally slidable with respect to each other along said axis, each said sleeve having an external surface which engages said recessed surface of one of the holder saddles;

each said storage and dispenser unit is thereby nested within one of said saddles of the holder; and each saddle is substantially identically sized and shaped, each having a recessed surface which is complementary in size and shape to that of said sleeve.

27. The multiple-day system in accordance with claim 26, wherein each said saddle is generally concave in transverse cross-section, a portion of each of said tray and said sleeve is generally convex in transverse cross section and sized and shaped to nest one into the other, with the sleeve being sized and shaped to fit within the saddle.

28. The multiple-day system in accordance with claim 26, further including attachment members for releaseabley securing said sleeve into said saddle.

29. The multiple-day system in accordance with claim 28, wherein said attachment members comprise a detent at one of said saddle or a tray end wall and an indent at the other of said saddle or a sleeve end wall.

30. The multiple-day system in accordance with claim 26, wherein said tray includes at least one transverse divider wall to provide a plurality of compartments of the interior of said tray.

31. The multiple-day system in accordance with claim 30, wherein at least one said divider is removable.

32. A method for storing and dispensing medication and for monitoring a regimen for the medication to be dispensed, comprising the steps of:

providing a medication storage and dispensing unit comprising a tray having an interior with multiple compartments adapted to receive medication, a sleeve sized and shaped to longitudinally slide with respect to said tray along a longitudinal axis in order to thereby selectively open or close at least one of the compartments;

securing to the unit an electronic medication regimen monitor having a housing with a longitudinal axis parallel to said longitudinal axis of the sleeve by sliding said unit and monitor relative to each other along said longitudinal axes, said monitor having operational logic which provides a plurality of compliance signals for each of multiple medication regimen compliance times and which provides a non-compliance signal;

inserting medication into at least some of the multiple compartments, said inserting including longitudinally sliding the tray with respect to the sleeve, and said inserting being before or after said securing step;

prompting by the operational logic compliance by the user with one of the regimen compliance times, followed by refraining from responding to said prompting to thereby have a non-compliance signal active from the regimen monitor; and acknowledging the non-compliance signal by longitudinally sliding the tray with respect to the sleeve and removing the medication from one of the compartments.

33. The method in accordance with claim 32, wherein said prompting step includes designating a specific regimen compliance time which is the subject of the non-compliance signal.

34. The method in accordance with claim 32, wherein said acknowledging step includes removing a non-compliance signal.

35. The method in accordance with claim 32, wherein said non-compliance signal of the prompting step includes activating a non-compliance prompt and a non-compliance flag, one of which persists longer than the other.

36. The method in accordance with claim 32, wherein said providing step provides a plurality of the storage and dispensing units, and further including placing the units into a holder having a plurality of locations each adapted to receive one of the units.

37. The system in accordance with claim 1, wherein said sleeve, said tray and said monitor are each longitudinally slidable independently of and relative to each other.

38. The monitor in accordance with claim 13, wherein said housing, said sleeve and said tray are each longitudinally slidable independently of and relative to each other.

39. The unit in accordance with claim 21, wherein said tray member, said sleeve member and the monitor when received in said slot are each longitudinally slidable independently of and relative to each other.

40. The method in accordance with claim 32, wherein said tray, said sleeve and said monitor are each longitudinally slidable independently of and relative to each other.

41. The system in accordance with claim 1, wherein said sleeve substantially encompasses said tray.

42. The monitor in accordance with claim 13, wherein said sleeve substantially encompasses said tray.

43. The unit in accordance with claim 21, wherein said sleeve member substantially encompasses said tray member.

44. The system in accordance with claim 26, wherein said sleeve substantially encompasses said tray.

45. The method in accordance with claim 32, wherein said sleeve substantially encompasses said tray.

46. The system in accordance with claim 1, wherein said interior of said tray is constructed to receive the medication loosely therein.

47. The monitor in accordance with claim 13, wherein said tray is constructed to receive the medication loosely therein.

48. The unit in accordance with claim 21, wherein said interior volume of said tray member is constructed to receive the medication loosely therein.

49. The system in accordance with claim 26, wherein said interior surface of said tray is adopted to receive the medication loosely therein.

50. The method in accordance with claim 32, wherein said compartments of said tray are adopted to receive the medication loosely therein.

* * * * *

UNITED STATES PATENT AND TRADEMARK OFFICE

CERTIFICATE OF CORRECTION

PATENT NO. : 6,662,081 B1
DATED : September 2, 2003
INVENTOR(S) : David M. Gaeble and Julie A. Simonson It is certified that error appears in the above-identified patent and that said Letters Patent is hereby corrected as shown below:

Title page,
Item [57], ABSTRACT,
Line 3, after “pill” add -- , --.

Column 1,
Line 33, delete “know” insert -- known --.

Column 5,
Line 11, delete “flatted” insert -- flattened --.

Column 6,
Line 24, delete “played” insert -- play --.

Column 8,
Line 63, delete “releaseably” insert -- releasably --.

Column 9,
Line 30, delete “a” insert -- at --.

Column 11,
Line 42, delete “releaseabley” insert -- releasably --.

Signed and Sealed this

Thirteenth Day of July, 2004

JON W. DUDAS
*Acting Director of the United States Patent and Trademark Office*